(12) United States Patent
Correia et al.

(10) Patent No.: US 6,987,959 B1
(45) Date of Patent: Jan. 17, 2006

(54) DIVERSITY TRANSMISSION METHOD AND SYSTEM

(75) Inventors: Americo Correia, Corroios (PT); Ari Hottinen, Espoo (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/009,128

(22) PCT Filed: Jun. 18, 1999

(86) PCT No.: PCT/EP99/04237

§ 371 (c)(1),
(2), (4) Date: Feb. 26, 2002

(87) PCT Pub. No.: WO00/79701

PCT Pub. Date: Dec. 28, 2000

(51) Int. Cl.
*H04B 1/06* (2006.01)

(52) U.S. Cl. .................. 455/277.1; 455/101; 455/132; 455/562.1

(58) Field of Classification Search .............. 455/562.1, 455/132, 101, 561, 63.3, 63.1, 7, 25, 276.1, 455/275, 277.1; 375/347, 280, 281; 370/334
See application file for complete search history.

(56) References Cited

U.S. PATENT DOCUMENTS

| | | | | |
|---|---|---|---|---|
| 5,663,990 A | * | 9/1997 | Bolgiano et al. | 375/280 |
| 5,832,044 A | | 11/1998 | Sousa et al. | 375/347 |
| 5,859,879 A | * | 1/1999 | Bolgiano et al. | 455/101 |
| 6,724,843 B1 | * | 4/2004 | Clarkson et al. | 375/347 |
| 6,731,619 B1 | * | 5/2004 | Ramesh et al. | 370/334 |

OTHER PUBLICATIONS

V. DaSilva, et al., "Fading–Resistant Modulation Using Several Transmitter Antennas", IEEE Transactions on Communications, vol. 45, No 10, Oct. 1, 1997, pp. 1236–1244.

E. Biglieri et al., "Introduction to Trellis–Coded Modulation with Applications", Macmillan Pub., 1993, chapter 9.

D. Rainish—"Diversity Transform fro Fading Channels", IEEE Trans. On Communications pp. 1653–1661, Dec. 1996.

* cited by examiner

*Primary Examiner*—Lana Le
(74) *Attorney, Agent, or Firm*—Cohen, Pontani, Lieberman & Pavane

(57) ABSTRACT

The present invention relates to a diversity transmission method and system, wherein a transmission signal is divided into a plurality of subsignals. A first set of the subsignals in transmitted using a first diversity transmission scheme, and a second set of said subsignals is transmitted using a second diversity transmission scheme. Thus, a joint coordination between different types of diversity transmission schemes is proposed so as to achieve a significant capacity increase at a moderate complexity.

129 Claims, 2 Drawing Sheets

DIVERSITY TRANSMISSION METHOD AND SYSTEM

FIELD OF THE INVENTION

The present invention relates to a diversity transmission method and system for transmitting a transmission signal in a wireless communication system, such as the Universal Mobile Telecommunications System (UMTS).

BACKGROUND OF THE INVENTION

Wideband Code Division Multiple Access (WCDMA) has been chosen as the radio technology for the paired bands of the UMTS. Consequently, WCDMA is the common radio technology standard for third-generation wide-area mobile communications. WCDMA has been designed for high-data services and, more particularly, Internet-based packet-data offering up to 2 Mbps in indoor environments and over 384 kbps for wide-area applications.

The WCDMA concept is based on a new general structure for all layers built on technologies such as packet-data channels and service multiplexing. The new concept also includes pilot symbols and a time-slotted structure which has led to the provision of adaptive antenna arrays which direct antenna beans at users to provide maximum range and minimum interference. This is also crucial when implementing wideband technology where limited radio spectrum is available.

The uplink capacity of the proposed WCDMA systems can be enhanced by various techniques including multi-antenna reception and multi-user detection or interference cancellation. Techniques that increase the downlink capacity have not been developed with the same intensity. However, the capacity demand due to the projected data services (e.g. Internet) burdens more heavily the downlink channel. Hence, it is important to find techniques that improve the capacity of the downlink channel.

Bearing in mind the strict complexity requirements of terminals, and the characteristics of the downlink channel, the provision of multiple receive antennas is not a desired solution to the downlink capacity problems Therefore, alternative solutions have been proposed suggesting that multiple antennas or transmit diversity at the base station will increase downlink capacity with minor increase of complexity in terminal implementation.

In third-generation mobile radio systems in general and in particular for WCDMA systems, the downlink capacity is a bottleneck. This is due to fading of the transmitted signal, wherein the amplitude of the signal is subjected to random fluctuations. To overcome this situation, transmitter antenna diversity has been proposed for the downlink direction. Known transmitter diversities schemes can be divided into two categories, open loop systems and closed loop systems. The difference between the open loop and the closed loop systems is that the former sends a feedforward or training information, in order to provide an information about the channel at the receiver. On the other hand, the latter system gets knowledge of the channel at the transmitter side by virtue of a feedback path from the receiver to the transmitter. Selective Transmit Diversity (STD) is an example of a closed loop system which is easy to implement in digital cellular systems due to the presence of a permanent feedback connection. Furthermore, systems that employ either of the two categories of transmitter diversity are known.

The prior art diversity systems are described e.g. in document U.S. Pat. No. 5,832,044 and in the publications "Fading Resistant Modulation Using Several Transmitter Antennas" by Sousa et al., IEEE Trans. On Communications, pp. 1236–1244, October 1997, and "Diversity Transform for Fading Channels", by D. Rainish, IEEE Trans. On Communications, pp. 1653–1661, December 1996.

In the above prior art systems, all components of a constellation vector (super symbol) are transmitted via either of different antennas, different carrier frequencies, or diferent time slots. However, since the optimum decoding complexity grows exponentially with the number of components of the constellation vector, the transmission capacity is limited. Moreover, a high peak to average ratio results from an increased constellation size.

SUMMARY OF THE INVENTION

It is therefore an object of the invention to provide a diversity transmission method and system, by means of which the transmission capacity can be increased.

This object is achieved by a diversity transmission method for transmitting a transmission signal in a wireless communication system, comprising the steps of: dividing the transmission signal into a plurality of subsignals;
applying an orthonormal transformation to said plurality of subsignals;
transmitting a first set of the subsignals using a first diversity transmission scheme; and
transmitting a second set of the subsignals using a second diversity transmission scheme, the second diversity transmission scheme being different from the first diversity transmission scheme.

Furthermore, the above object is achieved by a transmitter for a diversity transmission system for transmitting transmission signal in a wireless communication system, comprising:
dividing means for dividing the transmission signal into a plurality of subsignals; and
mtransforming means for applying an orthonormal transformation to said plurality of subsignals;
transmitting means for transmitting a first set of the subsignals using a first diversity transmission scheme, and a second set of the subsignals using a second diversity transmission scheme different from the first diversity transmission scheme.

Additionally, the above object is achieved by a receiver for a diversity transmission system, for receiving a transmission signal in a wireless communication system, comprising:
receiving means for receiving a transmission signal comprising a first set of subsignals transmitted by using a first diversity transmission scheme, and a second set of subsignals transmitted by using a second diversity transmission scheme different from the first diversity transmission scheme; and
decoding means for decoding the transmission signal by deciding on a maximum likelihood between the received subsignals and corresponding estimated subsignals.

Accordingly, a joint coordination between different diversity transmission types is provided, which results in a significant capacity increase as compared to previous transmitter diversity schemes based on multidimensional fading resistant constellations. Thus, an optimum detection method can be used which makes the optimum decoding complexity grow linear with the dimension of the constellations.

In a cellular network, a fading resistant transmission scheme can be provided, where a base station uses M antennas or/and M time slots (regardless of the use a frame orientated power control) or,/and M carrier frequencies (for narrow band systems), wherein M denotes the dimension of the signal constellation.

Preferably, the first diversity transmission scheme is a space diversity transmission scheme, such as a selective transmitter antenna diversity (STD). The second diversity transmission scheme may be a frequency or time diversity scheme. The original signal constellation may be represented as a matrix, wherein each row of the matrix corresponds to a point in a multidimensional constellation. In particular, a complex diversity transformation may be used, wherein an orthonormal transformation to a constellation which preserves Euclidean distances but improves the resistance to fading may be performed. The orthonormal transformation may be achieved by a multiplication with a complex matrix. Preferably, each row of the complex matrix is orthogonal to any other row, wherein the determinant of the matrix is equal to one. The complex matrix may be obtained based on the upper bound on the symbol error rate or based on the cut off rate.

Preferably, the diversity transmission method is used in the downlink direction of a cellular network.

The transmission signal may be a bit stream and the plurality of subsignals may be substreams. In particular, the transmission signal may be a PSK signal, preferably a QPSK signal which can be represented by a vertex in a 2M-dimensional hyper-cube, where M denotes the dimension of the signal constellation. In this case, the receiving means may comprise a bank of 2M correlators, wherein M denotes the number of transmission antennas used in the first diversity transmission scheme.

The wireless communication system may be a WCDMA system, wherein the transmitter may be arranged in a WCDMA base station and the receiver in a WCDMA mobile station.

Furthermore, the first and second diversity transmission schemes may comprise an open loop and/or a closed loop system.

Preferably, time slots of frequency carriers used in the second diversity transmission scheme are spaced apart to such a degree that independent fading is assured. Thereby, the transmissions can be coordinated to mitigate the effects of multi-path Rayleigh fading, and the receiver can recover the entire M-dimensional transmitted signal constellation or vector, as long as the signal energy of at least one coordinate is large enough. In particular, the M-dimensional signal constellation may be generated by optimizing the bit error rate and the peak to average ratio for a Rayleigh fading channel. The bit-error-rate may be further improved by using the STD scheme. This scheme offers a significant performance improvement over the conventional single antenna N-PSK scheme and other known M-dimensional fading resisting constellations for a given bit-error-rate. In the downlink direction of a cellular network, a significant capacity increase is achieved as compared to uncoded N-PSK and other known M-dimensional fading resistant constellations.

Preferably, the transmitting means comprises a complex diversity transformation unit arranged for performing an orthonormal transformation to a constellation which preserves Euclidean distances but improves resistance to fading of an original signal constellation obtained from the dividing means.

Furthermore, the receiver may comprise channel estimation means for performing a channel estimation used for obtaining the corresponding estimated subsignal.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the following, the present invention will be described in greater detail on the basis of a preferred embodiment which reference to the accompanying drawings, in which.

DESCRIPTION OF THE PREFERRED EMBODIMENT

In the following, the preferred embodiment of the present invention will be described on the basis of a downlink transmission between a base station and a mobile station of a cellular network such as the UMTS.

In spectrally efficient transmitter antenna, frequency and time diversity schemes, the information bit stream is divided into substreams, wherein each substream is transmitted over a different antenna, a different frequency, or a different time slot. Taking jointly, the transmission of a set of symbols can be viewed as the transmission of a super symbol. In the case of a QPSK transmission, the super symbol can be represented by a vertex in a 2M-dimensional hyper-cube, where M denotes the number of antennas, frequencies, or time slots.

According to the preferred embodiment of the present invention, a wideband system is considered such that the use of multiple carriers is not appropriate and will not be described in detail. However, the present invention is not restricted to wideband systems.

The WCDMA system operates at a low signal to noise ratio. Therefore, optimal signaling constellations for N-PSK modulations which are fading resistant at low signal to noise ratios are required.

The transmitter transmits a sequence of symbols from a fixed symbol alphabet. As already mentioned, each symbol may be represented as a vector in an M-dimensional vector space. Thus, each vector has M components. According to the present invention, the transmission of the M components is combined in different antennas and different time slots. Furthermore, in case of narrowband systems, a combination with different frequency carriers can be used for transmitting the M components. In particular, the constellation is obtained from an M-dimensional hyper-cube based on an orthogonal transformation. However, the separation between constellation points may be further maximized and none of the points are superimposed. The result is a much better performance over fading channels.

Figure 1:
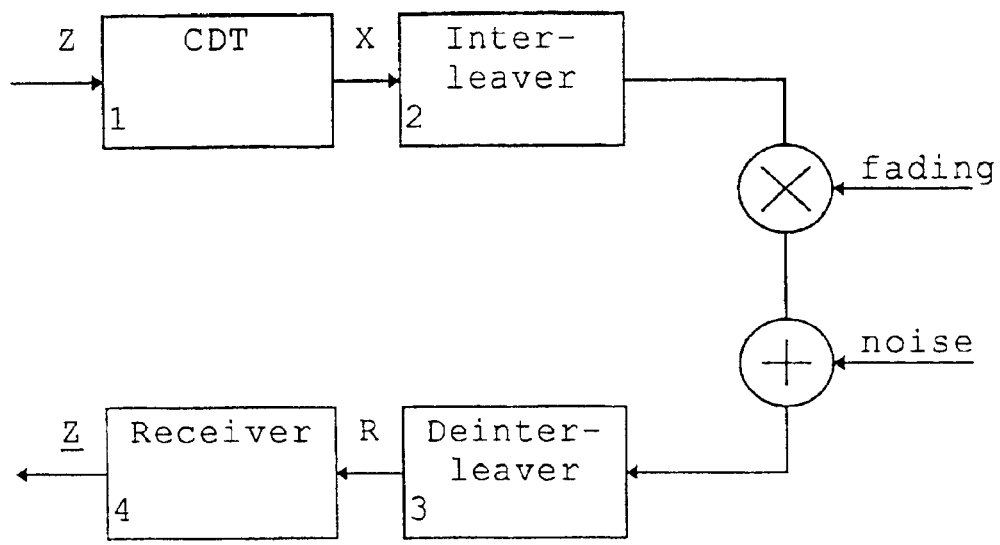
FIG. 1 shows a principle block diagram of a transmission system according to the present invention.

FIG. 1 shows a principle block diagram of the diversity transmission system according to a present invention. The system comprises M transmitter antennas (not shown) for transmitting a transmission signal from a base station to a mobile terminal, and a single receiver antenna (not shown). Thus, the received base band signal is obtained by the following equation:

$$r(t) = \sum_{i=1}^{M} x_i s_i(t) \sum_{j=1}^{L} (\alpha_i^j + n_i^j(t)) \tag{1}$$

Between the receiver antenna and each transmitter antennas there are L multi-paths, wherein the symbol $\alpha_i^j$ denotes the Rayleigh fading of the j-th multi-path of the i-th transmit antenna at the receiver, $x_i$ represents the N-PSK transformed signal on the i-th antenna, $s_i(t)$ denotes a bandlimited pulse, where $s_i(t)$, $s_k(t)$ are assumed to be orthogonal for i≠k. similarly, $n_i^j$ (t) denotes the added AWGN (Additive Wide Gaussian Noise) with power spectral density No/2.

An independent fading can be assumed if the transmitter antennas or time slots of frequency carriers are sufficiently spaced apart.

According to the present invention, the receiver 4 is capable of estimating the fading amplitude of each link. This is possible, if the fading amplitudes vary slowly over time. If the fading amplitudes vary quickly over time, it is expected that the receiver performance degrades due to estimation errors.

In the transmitter, a complex diversity transformation unit 1 is provided for performing a diversity transformation of an input signal constellation set which can be represented as a matrix. The interleaver 2 and deinterleaver 3 shown in FIG. 1 are not specific to the diversity transformation. They relate to the usual interleaving required for systems with forward error correction capabilities. In such systems, it is necessary to assure that fading amplitudes are uncorrelated. The delay introduced by the interleaver depends on the giving service and the general fading characteristics.

The original signal constellation is represented as a matrix Z, where each row corresponds to a point in the M-dimensional constellation corresponding to M input (encoded) symbols. Given the M-dimensional constellation of $Q=N^M$ points, a transformation is applied by the complex diversity transformation unit 1, such that the Euclidean distances between the constellation points are preserved, but the constellations resistance to fading is improved. The requirement that the transformation preserves the Euclidean distances between points and norms is imposed to thereby assure that the performance of the new constellation in the AWGN channel is not degraded. Such orthonormal transformations are called isometries.

For example, in case of a BPSK or a QPSK system, the original constellations for M=2 are given by $$Z_{BPSK} = \begin{bmatrix} 1 & 1 \\ 1 & -1 \\ -1 & -1 \\ -1 & 1 \end{bmatrix}, Z_{QPSK} = \begin{bmatrix} 1+j & 1+j \\ 1+j & 1-j \\ 1+j & -1-j \\ 1+j & -1+j \\ 1-j & 1+j \\ 1-j & 1-j \\ 1-j & -1-j \\ 1-j & -1+j \\ -1-j & 1+j \\ -1-j & 1-j \\ -1-j & -1-j \\ -1-j & -1+j \\ -1+j & 1+j \\ -1+j & 1-j \\ -1+j & -1-j \\ -1+j & -1+j \end{bmatrix}$$

These constellation matrixes are multiplied in the complex diversity transformation unit 1 by an orthonormal M×M matrix $A_M$ to thereby preserve the distance between vectors, and the energy. The transformed constellation x is given by $$X = ZA_M \quad (2)$$

To be orthonormal, the complex matrix AM must fulfill the following conditions:
(1) each row is orthogonal to any other row;
(2) the determinant of the matrix is equal to one.

According to the invention, the orthonormal complex matrixes for M=2 and $M=2^n$ are generally given by $$\overline{A_2} = \frac{A_2}{|A_2|^{1/M}}, A_2 = \begin{bmatrix} e^{j\phi} & e^{-j\phi} \\ -e^{-j\phi} & e^{j\phi} \end{bmatrix}, |A_2| = det(A_2) = 2\cos(2\phi) \quad (3)$$

$$\overline{A_{2n}} = \frac{A_{2n}}{|A_{2n}|^{1/M}}, A_{2n} = \begin{bmatrix} A_n & A_n \\ A_n & -A_n \end{bmatrix}, |A_{2n}| = det(A_{2n}) = f(\phi)$$

wherein φ denotes the angle that must be chosen in order to minimize the error probability in fading channels. This, however, constitutes an untractable problem in mathematics. Therefore, two other suboptimal approaches can be used, i.e. the upperbound on the symbol error rate and the cutoff rate, wherein the vector is assumed to be part of a random code with infinite length in which all vectors are independent. The upperbound on the symbol error rate is described e.g. in "Introduction to Trellis-Coded Modulation with Applications" by E. Biglieri et al., Macmillan Pub., 1993, chapter 9, and is given by $$P(x \to \underline{x}) = \text{Min } \forall (x, \underline{x}) \prod_{i=1}^{M} \frac{1}{1 + \frac{E_s}{4N_0}|x_i - \underline{x}_i|^2} \quad (4)$$

and the cutoff rate is described e.g. in "Diversity Transform for Fading Channels" by D. Rainish, IEEE Transaction On Communications, pp. 1653–1661, December 1996. and is given by $$R_0 = \log_2 N - \frac{1}{M}\log_2\left[\forall (x, \underline{x}) \prod_{i=1}^{M} \frac{1}{1 + \frac{E_s}{4N_0}|x_i - \underline{x}_i|^2}\right] \quad (5)$$

wherein N denotes the dimension of the modulation, e.g. N=4 for QPSK modulation.

Comparing the two above equations (4) and (5) it can be seen that they are somehow related. The main difference lies in the minimum operator only used in the bit error rate upperbound. This criteria is optimum for a use of the scheme in a high signal to noise ratio environment. In this invention, however, the interesting signal to noise ratio (SNR) comprises small values of $E_s/N_O$. Thus, the cutoff rate is preferably chosen, because it considers all pairs of (x,x), wherein x indicates the transmitted vector and x denotes the super symbol picked up in the receiver 4. There are certain values of φ which cannot be used. Those values must be avoided. For N-PSK modulations, the acceptable angles are defined by $$\phi \neq \pi/N, \phi < \pi/N \quad (6)$$

To be fading resistant, any two points of the signal constellation should have a large number of components which differ significantly. For every M and in particular for M=2, it is important that the determinant of the complex matrix $A_M$ is minimized, such chat a large number of components differ significantly and a better performance of the scheme is achieved, However, to obtain low determinant values, the limit given by equation (6) must be approached, which originates signaling constellation points close to zero and high peak to average amplitude ratios. The search for an optimal angle φ can be made exhaustively for small discredisation intervals, e.g. 1°, because only one angle has to be optimized. The optimal interval for the angle φ is [π/8, π/6]. In the preferred embodiment, an angle φ=π/6 has been chosen. For this angle, the determinant of the complex matrix $A_2$ is equal to one.

In general, the performance results obtained by a complex orthogonal matrix are better than those obtained by a real orthonormal matrix for M=2 and M=4.

According to the preferred embodiment of the present invention, a selective transmitter antenna diversity (STD) is combined with the complex diversity transformation (CDT). Thereby, a diversity of any order can be obtained. For instance, a diversity of order 8 can be obtained e.g. by using a complex diversity transformation of order 4 (time diversity) and an STD with 2 antennas, or by using a complex diversity transformation of order 2 and a STD diversity with 4 antennas.

Figure 2:
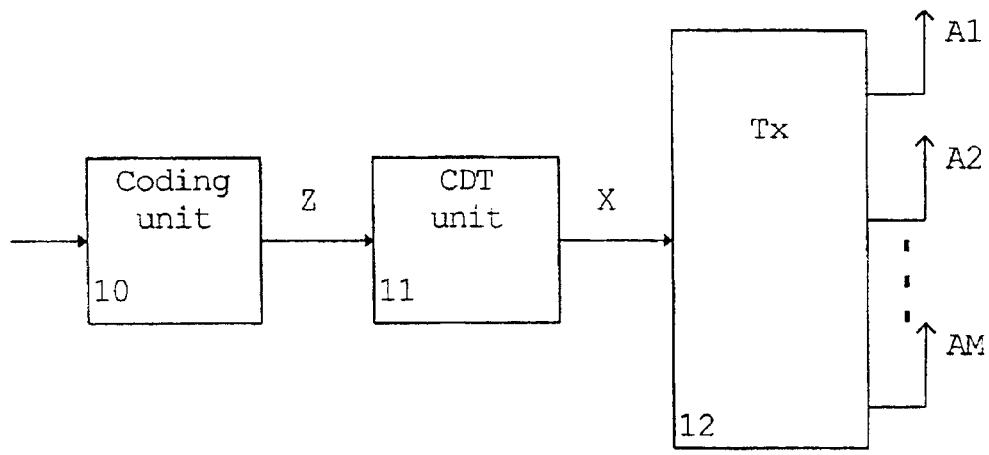
FIG. 2 shows a principle block diagram of a transmitter according to a preferred embodiment of the present invention.

FIG. 2 shows a principal block diagram of a transmitter which may be used in a base station and in which a combined CDT and STD are performed. According to FIG. 2 the transmitter comprises a coding unit 10 arranged for generating the signal constellation matrix Z based on received input symbols to be transmitted to a mobile station. The generated constellation matrix Z is supplied to a complex diversity transformation unit 11 which performs a multiplication of the constellation matrix Z with the orthonormal matrix $A_M$, as defined in the equation (2). In particular, the coding unit 10 and the complex diversity transformation unit 11 may be realize, by corresponding digital processing circuits or by a central processing unit controlled on the basis of a corresponding control program. The obtained transformed signal constellation matrix X is supplied to a transmitting unit Tx 12, wherein each column of the transformed constellation matrix X corresponds to a respective one of a plurality of transmission antennas A1, A2, . . . AM, such that a first set of subsignals or subsymbols (correspoonding to the matrix columns) are transmitted via respective different ones of the transmission antennas A1 to AM, and a second set of subsignals or subsymbols (corresponding to matrix rows) are transmitted in respective different time slots.

Figure 3:
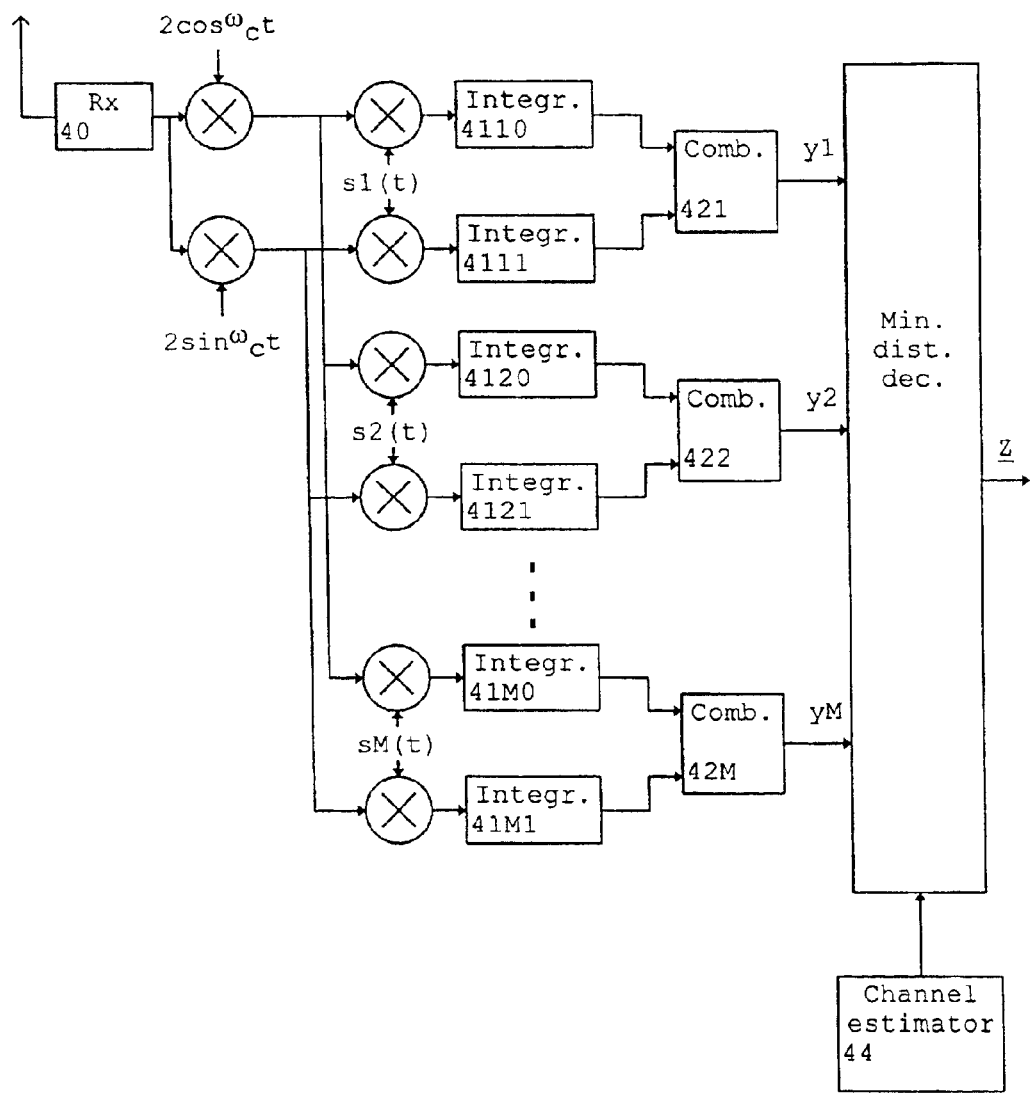
FIG. 3 shows a principle block diagram of a receiver according to a preferred embodiment of the present invention.

FIG. 3 shows a corresponding receiver of the transmission system, which may be provided in a mobile station of a cellular network. In the present case, a QPSK modulation is used for the transmission, wherein the receiver is a QPSK optimum receiver consisting of a bank of 2M integrators (or correlators) 4110, 4111, 4120, 4121, . . . 41M0, 41M1.

The radio signals transmitted from the transmission antennas A1 to AM are received via a single receiving antenna by a receiving unit Rx 40 of the receiver, and an in-phase component and a quadrature component are obtained by multiplying the received signal with a sine signal and a cosine signal, respectively, of the carrier frequency. The in-phase and quadrature components are each supplied to M processing channels, where a detection is performed based on a multiplication with respective bandlimited pulse signals $s_1(t), s_2(t), \ldots s_M(t)$. The detected received signals are supplied to respective ones of the integrators 4110 to 41M1. In the present preferred embodiment, only coherent demodulators are considered. For a single path Rayleigh fading channel (L=1, subscript j dropped), the output of the i-th integrator (correlator) is given by $$y_i = \int_0^T r(t)s_i(t)dt = \alpha_i x_i E_s + \eta_i, \quad E_s = \int_0^T s_i^2(t)dt \quad (7)$$

wherein $\eta_i$ ($1 \leq i \leq M$) denotes an uncorrelated zero-mean Gaussian random variable with variance $N_0 E_s$, and wherein T denotes the time period of a received symbol. Thus, most of the energy of the signal $s_i(t)$ is contained in the interval [0, T].

The outputs of the integrators 411C, 4120, . . . , 41M0 of the in-phase component and the integrators 4111, 4121, . . . , 41M1 of the quadrature component are combined by respective combining circuits 421 to 42M which output the components $y_1$ to $y_M$ of the received vector y. The received vector $y=(y_1, \ldots y_M)$ is supplied to a decision device such as a minimum distance decoder 43 which estimates the transmitted vector $x=(x_1, \ldots x_M)$. Furthermore, a channel estimator 44 is provided for estimating fading amplitudes $\alpha_i$ and for supplying the estimated fading amplitudes $\alpha_i$ to the minimum distance decoder 43. The minimum distance decoder 43 selects a super symbol $\underline{x}=(\underline{x}_1, \ldots \underline{x}_M)$ which is an element of an M-dimensional constellation. The selection is performed in such a manner that the following equation is satisfied $$\text{Min} \sum_{i=1}^{M} |y_i/E_s - \alpha_i x|^2, \forall (x, \underline{x}) \quad (8)$$

A symbol detecting error occurs, when $x \neq \underline{x}$. Thus, the receiver is a maximum likelihood receiver arranged to choose between $N^M$ (N is the size of the alphabet) possible different combinations of $(x, \underline{x})$.

The communication links between the transmitting antennas A1 to AM, and the receiving antenna are not generally line-of-sight links. In general, a multi-path Rayleigh fading model is assumed. The fading amplitudes $\alpha_i^j$ are modelled as independent and identically distributed Rayleigh random variables, wherein the probability density function is given by $$f(\alpha) = 2\alpha \exp(-\alpha^2), \alpha \geq 0 \quad (9)$$

It is to be noted that the interleave 2 and the deinterleaver 3 shown in FIG. 1 and required for forward error correction capabilities are not shown in the transmitter and the receiver according to FIGS. 2 and 3, respectively.

The present invention is not restricted to a combination of CDT with STD. Any combination of different diversity schemes can be used, wherein a combination of a space diversity scheme such as STD with time diversity schemes such as CDT, RDT (Real Diversity Transformation), may be applied.

The reference probability of the bit error rate for uncoded wideband systems is $P_b = 4 \times 10^{-2}$. For this reference $P_b$, a gain of 2 dB can be achieved between CDT and RDT without STD. If STD is combined with other diversity transformations, a gain of 1.5 dB is achieved between CDT and RDT. Compared to a single STD, the combination of CDT with STD provides an additional gain of 2.1 dB. For all diversity transformations, an optimal angle $\phi = \pi/6$ has been obtained.

For higher diversity orders, such as M=4, CDT continues to provide additional gain over RDT with and without STD, however, now these gains are not so significant. When CDT (with diversity order 2) and STD (with diversity order 2) are combined, the equivalent diversity order is 4. Another way to achieve this diversity order is CDT with diversity order 4. The comparison between these two cases indicates that CDT+STD leads to a better performance and should therefore be chosen.

The minimum distance decoder 43 shown in FIG. 3 is able to avoid the exponential growth of the decoding complexity, when the minimum distance is chosen between $(x, \underline{x})$, as given by equation (8). This can be gathered from the following equation $$|y_1/E_s - \alpha_1 \underline{x}_1|^2, \forall(x_1, \underline{x}_1) \therefore |y_2/E_s - \alpha_2 \underline{x}_2|^2, \forall(x_2, \underline{x}_2) \therefore \ldots |y_M/E_s - \alpha_M \underline{x}_M|^2, \forall(x_M, \underline{x}_M) \quad (10)$$

Since the metrics is positive and additive, it is better to compute the minimum distance individually for each link i and decide individually on the transmitted symbols.

As an example, a 4-PSK signal with diversity order M=4 is considered. Based on the equation (10) the following result is obtained.

$$d_1=|y_1/E_s-\alpha_1(1+j)|^2, d_2=|y_1/E_s-\alpha_1(1-j)|^2, d_3=|y_1/E_s-\alpha_1(-1-j)|^2, d_4=|y_1/E_s-\alpha_1(-1+j)|^2 \quad (11)$$

Accordingly, the minimum is chosen for all $d_n(1\leq n\leq N)$, which leads to the decision on $x_1$. Next, the decision is made as to $x_2$, based on the minimum of N metrics, and so on, until a decision is made on $x_M$, also based on N metrics, wherein N=4. Thus, M decisions are performed based on N metrics. Thus, N×M metrics have to be computed, instead of $N^M$ as in the known solutions.

The present inventions can be implemented in a variety of ways. A combination of spectrally efficient transmitter tire diversity of order $M_1$ with a selective transmitter antenna diversity (STD) of order $M_2$ is preferred to achieve a total diversity order of $M=M_1\times M_2$. For narrowband systems, the present invention can be implemented as a spectrally efficient transmitter frequency diversity scheme in combination with STD, so as to increase the order of the diversity.

The present invention can be applied to improve the performance of the physical layer of the UMTS UTRA/FDD (UMTS Radio Access/Frequency Division Duplex) components. Alternatively, it may be implemented in the physical layer of UMTS UTRA/TDD (Time Division Duplex) components. In general, the present invention can be implemented in any transmission link of any digital cellular network to thereby increase the capacity of that link. Therefore, the above description of the preferred embodiment and the accompanying drawings are only intended to illustrate the present invention. The preferred embodiment of the invention may vary within the scope of the attached claims.

In summary, the present invention relates to a diversity transmission method and system, wherein a transmission signal is divided into a plurality of subsignals. A first set of the subsignals is transmitted using a first diversity transmission scheme, and a second set of the subsignals is transmitted using a second diversity transmission scheme, Thus, a joint coordination between different types of diversity transmission schemes is proposed so as to achieve a significant capacity increase at a moderate complexity.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A diversity transmission method for transmitting a transmission signal in a wireless communication system, comprising the steps of:
   a) dividing said transmission signal into a plurality of subsignals;
   b) applying an orthonormal transformation to said plurality of subsignals;
   c) transmitting a first set of subsignals using a first diversity transmission scheme; and
   d) transmitting a second set of said subsignals using a second diversity transmission scheme, said second diversity transmission scheme being different from said first diversity transmission scheme.

2. A method according to claim 1, wherein said first diversity transmission scheme is a space diversity transmission scheme.

3. A method according to claim 2, wherein said second diversity transmission scheme is a frequency or time diversity scheme.

4. A method according to claim 2, wherein said diversity transmission method is used in a downlink transmission of a cellular network.

5. A method according to claim 2, wherein said transmission signal is a bit stream and said plurality of subsignals are substreams.

6. A method according to claim 2, wherein said wireless communication system is a WCDMA system.

7. A method according to claim 2, wherein said first and second diversity transmission schemes comprise at least one of an open loop and a closed loop system.

8. A method according to claim 2, wherein time slots of frequency carriers used in said second diversity transmission scheme are spaced apart to such a degree that independent fading is assured.

9. A method according to claim 2, wherein said transmission signal comprises a signal constellation generated by optimizing the bit error rate and the peak to average ratio for a Rayleigh fading channel.

10. A method according to claim 2, wherein said space diversity transmission scheme is a selective transmitter antenna diversity scheme.

11. A method according to claim 10, wherein said second diversity transmission scheme is a frequency or time diversity scheme.

12. A method according to claim 10, wherein said diversity transmission method is used in a downlink transmission of a cellular network.

13. A method according to claim 10, wherein said transmission signal is a bit stream and said plurality of subsignals are substreams.

14. A method according to claim 10, wherein said wireless communication system is a WCDMA system.

15. A method according to claim 10, wherein said first and second diversity transmission schemes comprise at least one of an open loop and a closed loop system.

16. A method according to claim 10, wherein time slots of frequency carriers used in said second diversity transmission scheme are spaced apart to such a degree that independent fading is assured.

17. A method according to claim 10, wherein said transmission signal comprises a signal constellation generated by optimizing the bit error rate and the peak to average ratio for a Rayleigh fading channel.

18. A method according to claim 1, wherein said second diversity transmission scheme is a frequency or time diversity scheme.

19. A method according to claim 18, wherein said diversity transmission method is used in a downlink transmission of a cellular network.

20. A method according to claim 18, wherein said transmission signal is a bit stream and said plurality of subsignals are substreams.

21. A method according to claim 18, wherein said wireless communication system is a WCDMA system.

22. A method according to claim 18, wherein said first and second diversity transmission schemes comprise at least one of an open loop and a closed loop system.

23. A method according to claim 18, wherein time slots of frequency carriers used in said second diversity transmission scheme are spaced apart to such a degree that independent fading is assured.

24. A method according to claim 18, wherein said transmission signal comprises a signal constellation generated by optimizing the bit error rate and the peak to average ratio for a Rayleigh fading channel.

25. A method according to claim 18, wherein said second diversity transmission scheme is a complex diversity transform scheme.

26. A method according to claim 25, wherein said diversity transmission method is used in a downlink transmission of a cellular network.

27. A method according to claim 25, wherein said transmission signal is a bit stream and said plurality of subsignals are substreams.

28. A method according to claim 25, wherein said wireless communication system is a WCDMA system.

29. A method according to claim 25, wherein said first and second diversity transmission schemes comprise at least one of an open loop and a closed loop system.

30. A method according to claim 25, wherein time slots of frequency carriers used in said second diversity transmission scheme are spaced apart to such a degree that independent fading is assured.

31. A method according to claim 25, wherein said transmission signal comprises a signal constellation generated by optimizing the bit error rate and the peak to average ratio for a Rayleigh fading channel.

32. A method according to claim 25, wherein said complex diversity transform scheme comprises an orthonormal transformation to a constellation which preserves Euclidean distances.

33. A method according to claim 32, wherein said diversity transmission method is used in a downlink transmission of a cellular network.

34. A method according to claim 32, wherein said transmission signal is a bit stream and said plurality of subsignals are substreams.

35. A method according to claim 32, wherein said wireless communication system is a WCDMA system.

36. A method according to claim 32, wherein said first and second diversity transmission schemes comprise at least one of an open loop and a closed loop system.

37. A method according to claim 32, wherein time slots of frequency carriers used in said second diversity transmission scheme are spaced apart to such a degree that independent fading is assured.

38. A method according to claim 32, wherein said transmission signal comprises a signal constellation generated by optimizing the bit error rate and the peak to average ratio for a Rayleigh fading channel.

39. A method according to claim 32, wherein an original signal constellation represented as a matrix is used, and wherein each row of said matrix corresponds to a point in a multidimensional constellation.

40. A method according to claim 32, wherein said orthonormal transformation is achieved by a multiplication with a complex matrix.

41. A method according to claim 40, wherein said diversity transmission method is used in a downlink transmission of a cellular network.

42. A method according to claim 40 wherein said transmission signal is a bit stream and said plurality of subsignals are substreams.

43. A method according to claim 40, wherein said wireless communication system is a WCDMA system.

44. A method according to claim 40, wherein said first and second diversity transmission schemes comprise at least one of an open loop and a closed loop system.

45. A method according to claim 40, wherein time slots of frequency carriers used in said second diversity transmission scheme are spaced apart to such a degree that independent fading is assured.

46. A method according to claim 40, wherein said transmission signal comprises a signal constellation generated by optimizing the bit error rate and the peak to average ratio for a Rayleigh fading channel.

47. A method according to claim 40, wherein each row of said complex matrix is orthogonal to any other row, and wherein the determinant of said matrix is equal to one.

48. A method according to claim 47, wherein said complex matrix is obtained based on an upperbound on the symbol error rate or based on a cutoff rate.

49. A method according to claim 47, wherein said diversity transmission method is used in a downlink transmission of a cellular network.

50. A method according to claim 47, wherein said transmission signal is a bit stream and said plurality of subsignals are substreams.

51. A method according to claim 47, wherein said wireless communication system is a WCDMA system.

52. A method according to claim 47, wherein said first and second diversity transmission schemes comprise at least one of an open loop and a closed loop system.

53. A method according to claim 47, wherein time slots of frequency carriers used in said second diversity transmission scheme are spaced apart to such a degree that independent fading is assured.

54. A transmitter according to claim 47, wherein said second diversity transmission scheme is a time or frequency diversity transmission scheme using a plurality of time slots or carrier frequencies.

55. A method according to claim 40, wherein said complex matrix is obtained based on an upperbound on the symbol error rate or based on a cutoff rate.

56. A method according to claim 53, wherein said orthonormal transformation is achieved by a multiplication with a complex matrix.

57. A method according to claim 53, wherein said diversity transmission method is used in a downlink transmission of a cellular network.

58. A method according to claim 53, wherein said transmission signal is a bit stream and said plurality of subsignals are substreams.

59. A method according to claim 55, wherein said first and second diversity transmission schemes comprise at least one of an open loop and a closed loop system.

60. A method according to claim 53, wherein said first and second diversity transmission schemes comprise at least one of an open loop and a closed loop system.

61. A method according to claim 55, wherein said transmission signal comprises a signal constellation generated by optimizing the bit error rate and the peak to average ratio for a Rayleigh fading channel.

62. A method according to claim 53, wherein said transmission signal comprises a signal constellation generated by optimizing the bit error rate and the peak to average ratio for a Rayleigh fading channel.

63. A method according to claim 40, wherein said complex matrix is obtained based on an upperbound on the symbol error rate or based on a cutoff rate.

64. A method according to claim 63, wherein said diversity transmission method is used in a downlink transmission of a cellular network.

65. A method according to claim 63, wherein said transmission signal is a bit stream and said plurality of subsignals are substreams.

66. A method according to claim 63, wherein said wireless communication system is a WCDMA system.

67. A method according to claim 63, wherein said first and second diversity transmission schemes comprise at least one of an open loop and a closed loop system.

68. A method according to claim 63, wherein time slots of frequency carriers used in said second diversity transmission scheme are spaced apart to such a degree that independent fading is assured.

69. A method according to claim 63, wherein said transmission signal comprises a signal constellation generated by optimizing the bit error rate and the peak to average ratio for a Rayleigh fading channel.

70. A method according to claim 1, wherein said diversity transmission method is used in a downlink transmission of a cellular network.

71. A method according to claim 70, wherein said transmission signal is a bit stream and said plurality of subsignals are substreams.

72. A method according to claim 70, wherein said wireless communication system is a WCDMA system.

73. A method according to claim 70, wherein said first and second diversity transmission schemes comprise at least one of an open loop and a closed loop system.

74. A method according to claim 70, wherein time slots of frequency carriers used in said second diversity transmission scheme are spaced apart to such a degree that independent fading is assured.

75. A method according to claim 70, wherein said transmission signal comprises a signal constellation generated by optimizing the bit error rate and the peak to average ratio for a Rayleigh fading channel.

76. A method according to claim 1, wherein said transmission signal is a bit stream and said plurality of subsignals are substreams.

77. A method according to claim 76, wherein said wireless communication system is a WCDMA system.

78. A method according to claim 76, wherein said first and second diversity transmission schemes comprise at least one of an open loop and a closed loop system.

79. A method according to claim 76, wherein time slots of frequency carriers used in said second diversity transmission scheme are spaced apart to such a degree that independent fading is assured.

80. A method according to claim 76, wherein said transmission signal comprises a signal constellation generated by optimizing the bit error rate and the peak to average ratio for a Rayleigh fading channel.

81. A method according to claim 76, wherein said transmission signal is a QPSK signal which can be represented by a vertex in a 2M-dimensional hyper-cube, where M denotes the dimension of a signal constellation.

82. A method according to claim 81, wherein said wireless communication system is a WCDMA system.

83. A method according to claim 81, wherein said first and second diversity transmission schemes comprise at least one of an open loop and a closed loop system.

84. A method according to claim 81, wherein time slots of fequency carriers used in said second diversity transmission scheme are spaced apart to such a degree that independent fading is assured.

85. A method according to claim 81, wherein said transmission signal comprises a signal constellation generated by optimizing the bit error rate and the peak to average ratio for a Rayleigh fading channel.

86. A method according to claim 1, wherein said wireless communication system is a WCDMA system.

87. A method according to claim 86, wherein said first and second diversity transmission schemes comprise at least one of an open loop and a closed loop sysem.

88. A method according to claim 86, wherein said first and second diversity transmission schemes comprise at least one of an open loop and a closed loop system.

89. A method according to claim 86, wherein said transmission signal comprises a signal constellation generated by optimizing the bit error rate and the peak to average ratio for a Rayleigh fading channel.

90. A method according to claim 1, wherein said first and second diversity transmission schemes comprise at least one of an open loop and a closed loop system.

91. A method according to claim 90, wherein time slots of frequency carriers used in said second diversity transmission scheme are spaced apart to such a degree that independent fading is assured.

92. A method according to claim 90, wherein said transmission signal comprises a signal constellation generated by optimizing the bit error rate and the peak to average ratio for a Rayleigh fading channel.

93. A method according to claim 1, wherein time slots of frequency carriers used in said second diversity transmission scheme are spaced apart to such a degree that independent fading is assured.

94. A method according to claim 93, wherein said transmission signal comprises a signal constellation generated by optimizing the bit error rate and the peak to average ratio for a Rayleigh fading channel.

95. A method according to claim 1, wherein said transmission signal comprises a signal constellation generated by optimizing the bit error rate and the peak to average ratio for a Rayleigh fading channel.

96. A transmitter for a diversity transmission system for transmitting a transmission signal in a wireless communication system, comprising:
   a) dividing means (10) adapted to divide said transmission signal into a plurality of subsignals;
   b) transforming means (11) adapted to apply an orthonormal transformation to said plurality of subsignals; and
   c) transmitting means (12) adapted to transmit a first set of said subsignals using a first diversity transmission scheme, and a second set of said subsignals using a second diversity transmission scheme different from said first diversity transmission scheme.

97. A transmitter according to claim 96, wherein said first diversity transmission scheme is a space diversity transmission scheme using a plurality of transmission antennas (A1–AM).

98. A transmitter according to claim 97, wherein said second diversity transmission scheme is a time or frequency diversity transmission scheme using a plurality of time slots or carrier frequencies.

99. A transmitter according to claim 97, wherein said transforming means comprises a complex diversity transformation unit (11) arranged for performing an orthonormal transformation to constellation which preserves Euclidean distances.

100. A transmitter according to claim 97, wherein said transmitter is arranged in a WCDMA base station.

101. A transmitter according to claim 96, wherein said second diversity transmission scheme is a time or frequency diversity transmission scheme using a plurality of time slots or carrier frequencies.

102. A transmitter according to claim 101, wherein said transforming means comprises a complex diversity transformation unit (11) arranged for performing an orthonormal transformation to constellation which preserves Euclidean distances.

103. A transmitter according to claim 101, wherein said transmitter is arranged in a WCDMA base station.

104. A transmitter according to claim 96, wherein said transforming means comprises a complex diversity transformation unit (11) arranged for performing an orthonormal transformation to constellation which preserves Euclidean distances.

105. A transmitter according to claim 104, wherein said transmitter is arranged in a WCDMA base station.

106. A transmitter according to claim 96, wherein said transmitter is arranged in a WCDMA base station.

107. A receiver for a diversity transmission system, for receiving a transmission signal in a wireless communication system, comprising:
   a) receiving means (40, 4110, 4111, 4120, 4121, 41M0, 41M1, 421, 422, . . . 42M) adapted to receive a transmission signal comprising a first set of subsignals transmitted by using a first diversity transmission scheme, and a second set of subsignals transmitted by using a second diversity transmission scheme different from said first diversity transmission scheme; and
   b) decoding means (43) adapted to decode said transmission signal by deciding on a maximum likelihood between said received subsignals and corresponding estimated subsignals.

108. A receiver according to claim 107, further comprising channel estimation means (44) adapted to perform a channel estimation used for obtaining said corresponding estimated subsignals.

109. A receiver according to claim 108, wherein said first diversity transmission scheme is a space diversity transmission scheme.

110. A receiver according to claim 108, wherein said second diversity scheme is a time or frequency diversity scheme.

111. A receiver according to claim 108, wherein said transmission signal is a QPSK signal and said receiving means comprises a bank of 2M correlators, wherein M denotes the number of transmission antennas used in said first diversity transmission scheme.

112. A receiver according to claim 108, wherein said receiver is arranged in a mobile WCDMA terminal of cellular network.

113. A receiver according to claim 107, wherein said first diversity transmission scheme is a space diversity transmission scheme.

114. A receiver according to claim 113, wherein said second diversity scheme is a time or frequency diversity scheme.

115. A receiver according to claim 113, wherein said transmission signal is a QPSK signal and said receiving means comprises a bank of 2M correlators, wherein M denotes the number of transmission antennas used in said first diversity transmission scheme.

116. A receiver according to claim 113, wherein said receiver is arranged in a mobile WCDMA terminal of cellular network.

117. A receiver according to claim 113, wherein said space diversity transmission scheme is a selective transmitter antenna diversity scheme.

118. A receiver according to claim 117, wherein said second diversity scheme is a time or frequency diversity scheme.

119. A receiver according to claim 117, wherein said transmission signal is a QPSK signal and said receiving means comprises a bank of 2M correlators, wherein M denotes the number of transmission antennas used in said first diversity transmission scheme.

120. A receiver according to claim 117, wherein said receiver is arranged in a mobile WCDMA terminal of cellular network.

121. A receiver according to claim 107, wherein said second diversity scheme is a time or frequency diversity scheme.

122. A receiver according to claim 121, wherein said transmission signal is a QPSK signal and said receiving means comprises a bank of 2M correlators, wherein M denotes the number of transmission antennas used in said first diversity transmission scheme.

123. A receiver according to claim 121, wherein said receiver is arranged in a mobile WCDMA terminal of cellular network.

124. A receiver according to claim 121, wherein said time or frequency diversity scheme is a complex diversity transformation scheme.

125. A receiver according to claim 124, wherein said transmission signal is a QPSK signal and said receiving means comprises a bank of 2M correlators, wherein M denotes the number of transmission antennas used in said first diversity transmission scheme.

126. A receiver according to claim 124, wherein said receiver is arranged in a mobile WCDMA terminal of cellular network.

127. A receiver according to claim 107, wherein said transmission signal is a QPSK signal and said receiving means comprises a bank of 2M correlators, wherein M denotes the number of transmission antennas used in said first diversity transmission scheme.

128. A receiver according to claim 127, wherein said receiver is arranged in a mobile WCDMA terminal of cellular network.

129. A receiver according to claim 107, wherein said receiver is arranged in a mobile WCDMA terminal of cellular network.

* * * * *